United States Patent [19]

Besik

[11] 4,200,534
[45] Apr. 29, 1980

[54] APPARATUS FOR RENOVATION OF SANITARY WATERS

[76] Inventor: Ferdinand Besik, 3243 Chokecherry Crs., Mississauga, Ontario, Canada, L5L 1B1

[21] Appl. No.: 912,888

[22] Filed: Jun. 5, 1978

[51] Int. Cl.² .......................... C02C 1/08; C02C 1/12
[52] U.S. Cl. .................................. 210/195.3; 210/199; 210/202; 210/220; 210/521
[58] Field of Search ............... 210/170, 195 S, 198 R, 210/199, 202, 205, 207, 218, 220, 256, 260, 521

[56] References Cited

U.S. PATENT DOCUMENTS

| | | | |
|---|---|---|---|
| 2,679,477 | 5/1954 | Kivari et al. | 210/195 S X |
| 3,306,447 | 2/1967 | Medeiros | 210/170 X |
| 3,403,096 | 9/1968 | Mackrle et al. | 210/202 X |
| 3,419,146 | 12/1968 | Koulovatos | 210/195 S X |
| 3,472,764 | 10/1969 | Culp et al. | 210/195 S |
| 3,487,937 | 1/1970 | Koulovatos | 210/195 S |
| 3,545,619 | 12/1970 | Ettlich et al. | 210/202 X |
| 3,725,258 | 4/1973 | Spector et al. | 210/195 S X |
| 3,735,870 | 5/1973 | Uden | 210/195 S X |
| 3,764,012 | 10/1973 | Bohnke et al. | 210/195 S |
| 3,859,215 | 1/1975 | Milne | 210/170 |

FOREIGN PATENT DOCUMENTS

2457177  7/1975  Fed. Rep. of Germany ........... 210/170

*Primary Examiner*—Robert H. Spitzer

[57] ABSTRACT

A selfcontained apparatus for on-site renovation of sanitary waters comprises of three aeration chambers, a mineral storage and dispensing container, a submerged suspended solids separator located in the third aeration chamber, a flow equalizer, a chemical oxidizing agent dispensing system, a chemical oxidation-clarification chamber and a charcoal containing chamber, all enclosed in a single tank designed for use on land as a single or multiple family wastewater renovation system, or off-shore as a marine sanitation device.

4 Claims, 1 Drawing Figure

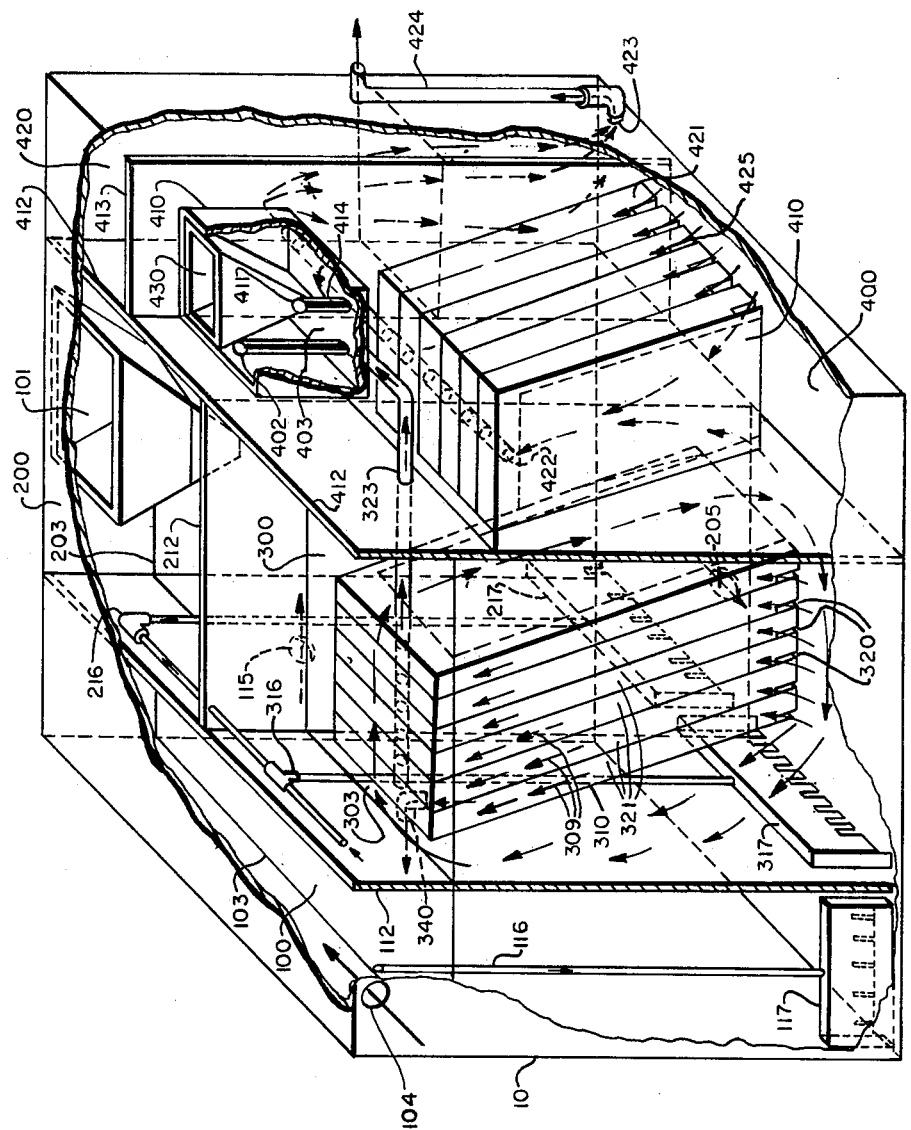

APPARATUS FOR RENOVATION OF SANITARY WATERS

This invention relates to an apparatus for renovation of sanitary waters and has for its object a provision of an improved system capable of unattended and reliable operation when purifying sanitary waters to a high quality effluent suitable for reuse.

BACKGROUND TO THE INVENTION

Overfertilization and chemical pollution of surface waters and degradation of potable water sources in densely populated areas is becoming a serious problem, calling for efficient removal of the various organic and nitrogenous compounds, phosphates and bacteria and viruses from all wastewaters.

Processes for the removal of the above contaminants have been established and are practiced in large municipal sewage treatment facilities.

To accomodate the various process stages required to remove the various contaminants such treatment plants are complex and hard to scale down to serve single family dwellings retaining the required efficiency and economy.

Consequently, housing developments are being served exclusively by centralized sewage treatment plants with the sewage being collected and transported to treatment plants via underground sewage collection-transportation systems.

As the population increases such sewage collection-transportation systems become expensive and quite often a limiting factor affecting community planing and/or development.

Although small sewage treatment plants are available, as yet they do not provide the desired degree of purification and do not offer the required process and mechanical reliability.

It is therefore an object of this invention to provide an apparatus in which the various processes to remove pollutants present in sanitary waters could be carried out reliably and unattended and at acceptable cost when serving single family dwellings.

More particularly it is the object of this invention to provide an apparatus that would reliably maintain all conditions required for efficient biooxidation of organic matter, biological transformation of the various nitrogenous compounds, chemical precipitation of soluble phosphates, chemical oxidation of the residual organics, efficient removal of bacteria and viruses and will render the effluent non-toxic to aquatic life and harmless to vegetation.

Another object of this invention is to provide an inexpensive and reliable method for storing and proportioning of the chemicals to the unsteady or batchwise flow of the incoming raw sewage.

Another object of this invention is to provide an inexpensive and reliable apparatus that will be easy to scale up or down to serve single or multiple family dwellings.

Another object of this invention is to provide an apparatus in which efficient separation of suspended solids from the effluent is achieved inside the aeration reactor so that a separate clarifier is not needed.

Another object of this invention is to provide an apparatus that would require only once per year replenishment of the used chemicals and only once or twice per year withdrowal of the excess sludge.

It is also an object of this invention to provide an apparatus capable of reliable and unattended operation when processing raw sewage on ships under conditions of ship motion and vibration.

It is still another object of the invention to provide an apparatus that would be capable to operate reliably also with powdered minerals or activated carbon or their mixture added into the aeration chambers.

Another object of the invention is to provide an improved suspended solids separator that would not be affected by "sloshing" that normally occures on ships during heavy roll and pitch conditions.

Other objects and features of the invention will be set forth more fully hereinafter.

The full nature of the invention will be understood from the accompanying drawing and the following description and claims.

SUMMARY OF THE INVENTION

The present invention combines all steps of the combined physical-chemical-biological treatment of raw sewage within a single tank. The tank is divided by partitions into separate reaction chambers so that the benefits of multistage systems can be utilised. In a prefered embodiment the tank of the present invention is made of steel and equipped with manways permitting entrance into individual chambers. The tank may be located below or above the ground or installed on ships to serve single or multiple family dwellings or as a marine sanitation device.

The incoming raw sewage enters into first aeration chamber to be mixed with mixed microbial population kept in the aerated liquor. As the raw sewage enters the first aeration chamber the level of the liquor in aeration chambers rises. A slow disolving mineral is stored in a perforated container located in the second aeration chamber. When the level of the liquor rises, the aerated liquor enters the mineral storage container and dissolves a portion of the mineral. The higher is the level of the liquor in the aeration chambers, the more of the mineral is submerged into the liquor and dissolved.

On its way through aeration chambers the sewage is contacted with mixed microbial population-activated sludge suspended in the aerated liquor and the biodegradable organic and nitrogenous compounds are biooxidised, and the soluble phosphates are precipitated by the added mineral. The reactor liquor is in each aeration chamber aerated by compressed air introduced into the liquor through non-clog diffusers.

From the third aeration chamber the treated sewage flows through a submerged multichannel suspended solids separator located in the third aeration chamber into chemical oxidizing agent dispensing chamber, then into a chemical oxidation-clarification chamber to carry out the chemical oxidation of the residual pollutants, to kill the bacteria and viruses and to remove the residual suspended solids. The disinfected effluent is then flown through a charcoal bed to remove the unreacted chemical oxidizing agent to render the effluent non-toxic to aquatic life and suitable for reuse.

DETAILED DESCRIPTION OF THE APPARATUS

A cut away perspective view of the complete apparatus of the present invention is shown in FIG. 1. The apparatus comprises of first aeration chamber 100 formed by partition 112 and the outside walls and the floor of the tank 10 and equipped with an air diffuser 117; the second aeration chamber 200 formed by partitions 112, 212 and 412 and one outside wall and floor of the tank 10 and equipped with air diffuser 217; the third aeration chamber 300 formed by partitions 112, 212, 412 and the second outside wall and floor of the tank 10 and equipped with an air diffuser 317 and a submerged multichannel suspended solids separator 310; the flow equiliser 402; a chemical oxidizing agent dispensing chamber 410; chemical oxidizing agent storage-dispensing container 430; chemical oxidation-clarification chamber 400 formed by partitions 412 and 413 and the side walls and floor of the tank 10; and charcoal containing chamber 420 formed by partitions 412, 413 and the side walls and floor of the tank 10.

Refering to the system's hydraulics, at periods of zero flow of the incoming sewage the liquid level in aeration chambers is at levels 103, 203 and 303, with the reactor liquor containing mixed liquor suspended solids being continuously aerated in each aeration chamber by compressed air introduced into the first aeration chamber via air line 116, into the second aeration chamber via line 216 and into the third aeration chamber via line 316, the aerated liquor being circulated from third aeration chamber 300 via opening 340 in partition 112 into the first aeration chamber 100, from first aeration chamber 100 via opening 115 in partition 112 into the second aeration chamber 200 and from second aeration chamber 200 via opening 205 in partition 212 back into the third aeration chamber 300. Under these conditions at zero flow of the incoming sewage the mineral storage-dispensing container 101 located in aeration chamber 200 is just above the liquid level 203, the mineral not being in contact with the aerated liquor maintained in aeration chamber 200 and therefore not being dissolved into the aerated liquor.

As the raw sewage enters via opening 104 into first aeration chamber the liquor level in the first, second and third aeration chambers rises, the increase in the height of the liquid level being proportional to the difference between the flow of incoming sewage and flow of the clarified effluent from the flow equiliser 402. The higher the flow rate of the incoming sewage the higher is the liquid level in the three aeration chambers and consequently the more of the mineral is submerged into the aerated liquor and dissolved.

As the mixture of sewage and sludge solids flows from first aeration chamber 100 into the second aeration chamber 200 and from second aeration chamber into the third aeration chamber 300 the biodegradable organic matter is biooxidised, the nitrogenous compounds transformed to nitrates and the soluble phosphates precipitated. In each aeration chamber the mixing of the sewage with the sludge solids is maintained by compressed air introduced into the liquor via non-clog diffusers 117, 217 and 317.

In the third aeration chamber 300 the mixture of purified sewage and mixed liquor suspended solids enters into a submerged multichannel suspended solids separator 310 via opening 320 located at the lower end of the separator 310, then flows upward in channels 321 in direction of arrows 309, then into a centrally located collection line 323 and out of aeration chamber 300 into a flow equiliser 402 located in chamber 410. On the way up in channels 321 suspended solids are settled out on the walls of the inclined channels, then continuously slid down into the recirculated liquor.

The suspended solids separated from the purified sewage are circulated in the third aeration chamber upwardly in the space between partition 112 and the suspended solids separator 310 and downwardly in the space between partition 412 and the suspended solids separator 310. Portion of the separated suspended solids is continuously recycled into aeration chamber 100 via opening 340 located in partition 112.

The flow equilizer 402 located in the chemical oxidizing agent dispensing chamber 410 consists of a vertical pipe with a narrow opening 403. The flow equilizer maintains the flow of the treated sewage through the suspended solids separator within the range permitted by the flow of the clarified effluent through the opening 403 regardless of the flow of the incoming sewage. At a surge flow of the incoming sewage the sewage accumulates in the three aeration chambers due to the equilizer which causes to rise the liquid level in aeration chambers to a level which is limited by the height of the flow equilizer pipe 402. In this way the detrimental effects of the surge of the incoming sewage on the involved biological processes and on the separation of suspended solids is eliminated.

The clarified effluent overflows from the opening 403 of the flow equilizer 402 into the chemical oxidizing agent dispensing chamber 410. To flow out from chamber 410 the effluent must pass through a narrow opening 414 which controls the flowrate out of chamber 410 into the chemical oxidation-clarification chamber 400. At the varying flow of the effluent from the flow equilizer 402 the level of the liquid in chamber 410 rises and varies within the height of the opening 414 of the vertical pipe 411. A granulated chemical oxidizing agent is stored in a perforated container 430 located in chamber 410 with the container's bottom touching the level of the liquid in chamber 410 at zero flow of the effluent through equilizer 402. The liquid level in chamber 410 rises proportionally to the flow rate of the effluent from this chamber submerging the perforated container 430 containing the chemical oxidizing agent into the effluent and disolving the oxidizing agent into the effluent proportionally to the flow of the effluent through chamber 410. Thus the amount of oxidizing agent deposited into a unit volume of the effluent in the apparatus of this invention is constant and is controled by the dimensions of the opening 414.

The effluent containing the chemical oxidizing agent flows into the lower portion of the chemical oxidation-clarification chamber 400 and via openings 425 into a submerged multichannel chemical reactor-clarifier 410. The multichannel reactor-clarifier prevents shortcutting of the chemically treated effluent within the chemical oxidation-clarification chamber thus providing conditions for efficient oxidation of the residual impurities, efficient kill of bacteria and viruses and simultaneously also efficient separation of the residual suspended solids. In channels 421 the chemically treated effluent flows upwardly into a centrally located collection line 422 and then out of chamber 400 and into chamber 420 for decomposition of the residual oxidizing agent. In chamber 420 the purified effluent flows downwardly through a bed of charcoal then via opening 423 and pipe 424 out of the apparatus for surface disposal or for reuse.

While the described apparatus is particularly useful for single family and multiple family wastewater renovation units, or as a marine sanitation device, it has applications to sewage treatment systems of various sizes. It is particularly useful as a standardised package plant for use on land or off shore in various permanent or temporary installations.

While the system of the present invention has been described for use with steel, it is obvious, that the system may be constructed of any convenient material such as reinforced concrete or fiber glass. Although the present invention has been described in part with reference to specific example, modifications may be constructed or used without departing from the scope of the invention which is defined in the following claims.

I claim:

1. A self contained apparatus for treatment of waste waters comprising a waste water receiving tank, said waste water receiving tank including first, second and third aeration chambers, said aeration chambers being formed by the tank walls and common partitions between the first, second and third aeration chambers, said first, second and third aeration chambers being equipped with air diffusers to aerate and to agitate the contents thereof, said first aeration chamber including an inlet and said third aeration chamber including an outlet, said aeration chambers being in communication through restricted openings in common partitions for flowing the waste water from the first aeration chamber into the second aeration chamber and from the second aeration chamber into the third aeration chamber, said third aeration chamber being equipped with a suspended solids separator for separating the suspended solids from the aerated waste water, said suspended solids separator being in communication with said third aeration chamber outlet, said suspended solids separator being composed of a number of parallel settling chambers completely submerged in the aerated waste water, said settling chambers each having openings in the side walls at the bottom of said settling chambers and restricted openings at the top for flowing the treated waste water from said third aeration chamber through said side wall openings into said settling chambers then upwardly through said settling chambers and out through said restricted openings into a collection channel, said collection channel being in communication with said third aeration chamber outlet, said third aeration chamber being also equipped with a channel located in said common partition between the first and third aeration chambers for flowing a portion of the aerated waste water and the separated suspended solids from said third aeration chamber into said first aeration chamber to distribute said suspended solids evenly through each aeration chamber, said third aeration chamber outlet being in communication with a flow equalizer for controlling the flow rate of the treated waste water in said settling chambers and out of said third aeration chamber, said waste water receiving tank comprising in addition a chemical agent dissolving chamber and a chemical oxidation chamber, said chemical agent dissolving chamber for dissolving the chemical agent into the treated waste water in proportion to the flow of the waste water, said chemical agent dissolving chamber being in communication with said flow equalizer and receiving the effluent therefrom, said chemical agent dissolving chamber having a vertical slit opening in one side wall causing to rise the level of the liquid therein in proportion to the flow of the treated waste therefrom and said chemical agent dissolving chamber in addition being equipped with a container for storing and dissolving the chemical agent into the treated waste water and the treated waste water flowing by gravity from said flow equalizer into said chemical agent dissolving chamber and through said slit opening out of said chemical agent dissolving chamber into said chemical oxidation chamber for chemical oxidation of impurities remaining in the treated waste water, and said chemical oxidation chamber having an outlet for flowing the chemically treated waste water out of the apparatus.

2. An apparatus according to claim 1 in which the chemical oxidation chamber is in addition equipped with a multichannel chemical reactor-clarifier, said multichannel chemical reactor-clarifier being submerged in the liquid retained in said chemical oxidation chamber, said multichannel chemical reactor-clarifier preventing shortcutting of the chemically treated waste water and permitting separation of the residual suspended solids from the chemically treated waste water and permitting the retaining of the residual suspended solids in said chemical oxidation chamber, said multichannel chemical reactor-clarifier having an inlet at the lower portion and an outlet at the top, said outlet being in communication with the chemical oxidation chamber outlet and said chemically treated waste water flowing by gravity downwardly in said chemical oxidation chamber, then upwardly through said multichannel chemical reactor-clarifier then through said chemical oxidation chamber outlet out of the apparatus.

3. An apparatus according to claim 1 comprising in addition a purification chamber for removing the remaining chemical oxidizing agent from the treated effluent by reaction with charcoal therein, said purification chamber in communication with and receiving the effluent directly from the chemical oxidation chamber, said charcoal being granulated and being retained in a fixed bed in said purification chamber, said purification chamber having an outlet and the treated effluent flowing by gravity through said charcoal and then through said outlet out of the apparatus.

4. A self contained apparatus for treatment of waste water comprising a waste water receiving tank, said waste water receiving tank including first, second and third aeration chambers, said aeration chambers being formed by the tank walls and common partitions between the first, second and third aeration chambers, said first, second and third aeration chambers being equipped with air diffusers to aerate and to agitate the contents thereof, said first aeration chamber including an inlet and said third aeration chamber including an outlet, said aeration chambers being in communication through restricted openings in common partitions for flowing the waste water from the first aeration chamber into the second aeration chamber and from the second aeration chamber into the third aeration chamber, said third aeration chamber being equipped with a suspended solids separator for separating the suspended solids from the treated waste water, said suspended solids separator being in communication with said third aeration chamber outlet, said suspended solids separator being composed of a number of parallel settling chambers completely submerged in the aerated waste water, said settling chambers each having openings in the side walls at the bottom of said settling chambers and restricted openings at the top for flowing the treated waste water from said third aeration chamber through said side wall openings into said settling chambers then upwardly through said settling chambers and out through said restricted openings into a collection channel, said collection channel being in communication with said third aeration chamber outlet, and said third aeration chamber being also equipped with a channel located in said common partition between the first and third aeration chambers for flowing a portion of the aerated waste water and the separated suspended solids from said third aeration chamber into said first aeration chamber to distribute said suspended solids evenly through each aeration chamber, said aeration chambers equipped also with a mineral storage-dispensing container for storing and dissolving a slow dissolving granulated mineral or a mixture of minerals into the treated waste water to precipitate impurities threfrom, said mineral storage-dispensing container having a perforated bottom located above the lowest level of the liquid in the aeration chamber at zero flow of the incoming waste water, said mineral storage-dispensing container being submerged into the aerated waste water during the flow of the incoming waste water to dissolve the mineral into the aerated liquid in proportion to the incoming waste water, said third aeration chamber outlet being in communication with a flow equalizer for controling the flow rate of the treated waste water in said settling chambers and out of said third aeration chamber, said waste water receiving tank comprising in addition a chemical agent dissolving chamber and a chemical oxidation chamber, said chemical agent dissolving chamber for dissolving the chemical agent into the treated waste water in proportion to the flow of the waste water, said chemical agent dissolving chamber being in communication with said flow equalizer and receiving the effluent therefrom, said chemical agent dissolving chamber having a vertical slit opening in one side wall causing to rise the level of the liquid therein in proportion to the flow of the treated waste water therefrom and said chemical agent dissolving chamber in addition being equipped with a container for storing and dissolving the chemical agent into the treated waste water flowing by gravity from said flow equalizer into said chemical agent dissolving chamber and through said slit opening out of said chemical agent dissolving chamber into said chemical oxidation chamber for chemical oxidation of impurities remaining in the treated waste water, and said chemical oxidation chamber having an outlet for flowing the chemically treated waste water out of the apparatus.

* * * * *